(12) United States Patent
Logosz

(10) Patent No.: US 7,032,864 B2
(45) Date of Patent: Apr. 25, 2006

(54) WING WITH INFLATABLE STRUTS

(76) Inventor: Tony Logosz, 1413 A St., Hood River, OR (US) 97031

( * ) Notice: Subject to any disclaimer, the term of this patent is extended or adjusted under 35 U.S.C. 154(b) by 0 days.

(21) Appl. No.: 10/732,046

(22) Filed: Dec. 9, 2003

(65) Prior Publication Data
US 2004/0195435 A1 Oct. 7, 2004

Related U.S. Application Data

(60) Provisional application No. 60/431,789, filed on Dec. 9, 2002.

(51) Int. Cl.
*B64C 31/06* (2006.01)

(52) U.S. Cl. ............... 244/153 R; 244/35 R; 244/146

(58) Field of Classification Search .......... 244/13, 244/35 R, 153, 901, 902, 142, 145, 146, 244/153 R
See application file for complete search history.

(56) References Cited

U.S. PATENT DOCUMENTS

| | | | | |
|---|---|---|---|---|
| 1,840,618 A | * | 1/1932 | Castner | 244/146 |
| 2,486,158 A | * | 10/1949 | Haas | 244/33 |
| 3,412,963 A | * | 11/1968 | Struble, Jr. | 244/146 |
| 4,708,078 A | * | 11/1987 | Legaignoux et al. | 114/102.23 |
| 5,762,293 A | * | 6/1998 | Crosbie | 244/33 |
| 5,816,537 A | * | 10/1998 | Pascoe et al. | 244/153 R |
| 2003/0150957 A1 | * | 8/2003 | Thomas | 244/153 R |

* cited by examiner

*Primary Examiner*—Peter M. Poon
*Assistant Examiner*—T D. Collins

(57) ABSTRACT

An aerodynamic wing formed by a flexible canopy with integrated inflatable, elastically deformable members integrated into the lifting surface. Preferably, the elastically deformable member extends and contracts the lifting surface depending on forces experienced by the wing. In one embodiment, the wing comprises an inflatable leading edge kite.

14 Claims, 5 Drawing Sheets

WING WITH INFLATABLE STRUTS

CROSS REFERENCE TO RELATED APPLICATIONS

This application claims priority of U.S. Provisional Patent Application Ser. No. 60/431,789, filed Dec. 9, 2002.

FIELD OF THE PRESENT INVENTION

The present invention relates generally to inflatable power or traction kites having struts configured to stabilize the canopy. More particularly, the invention relates to a strut and canopy structure that integrates the strut into the canopy surface.

BACKGROUND OF THE INVENTION

Recently, considerable effort is being expended to develop wings capable of generating tractive force for the purposes of powering a user on a variety of vehicles that are tethered solely by flexible lines. Such wings can generally be considered kites. The development of kites capable of generating significant force has made possible numerous recreational pursuits. For example, kite surfing or kite boarding refers to a sport involving the use of a wind powered wing to pull the participant on a vehicle across a body of water. Similar sports involving the use of appropriately configured vehicles to traverse sand, earth, snow and ice are also being pursued. One of skill in the art will also recognize that wind powered wings can be used in any number of other applications, whether recreational or practical. With the development of these applications has come an increasing demand for kites having improved characteristics.

One type of kite that has achieved popularity is a leading edge inflatable ("LEI") kite, typically comprising a semi-rigid framework of inflatable struts or spars that support a canopy to form the profile of the wing. This basic design is taught by U.S. Pat. No. 4,708,078 to Legaignoux, et al. The development of the LEI kite is generally credited with spurring the development of modern kite surfing due to its ability to be relaunched from the water's surface.

Despite the success of LEI kite design, they do suffer from certain, inherent challenges. A significant consequence of the use of inflatable struts is difficulty in maintaining the stability of LEI kites in use. This is particularly true when the kites are used in gusty or turbulent conditions. If insufficient pressure is used to inflate the struts, an undesirable flexibility can be imparted to the framework. However, practical considerations limit the amount of pressure that can be used. Higher pressures require the use of more expensive materials and more exacting manufacturing tolerances. Such pressures also increase the possibility of puncture or rupture failures and more generally detract from the overall convenience of the design.

The various characteristics considered desirable for the practice of kiteboarding suggest a number of possible LEI kite design parameters. Some of these characteristics include efficiency, durability, economy of manufacture, relaunchability, performance, handling and power control, most of which are interrelated. For example, attempts to improve the performance of a kite often involve increasing the aspect ratio of the wing. However, the ability of the kite to be relaunched tends to be inversely related to the aspect ratio. Likewise, one aspect a kite's efficiency is its lift to drag ratio, but increasing this ratio can have adverse effects on the handling of the kite. As yet another example, the durability of a kite can be improved by using stronger materials, but usually with the drawbacks of increasing the weight of the kite (and thus decreasing performance) and cost of manufacture. All of these characteristics depend to some degree upon the stability of the canopy and the rigidity of the wing in flight.

Accordingly, it is an object of the present invention to provide a LEI kite design that offers improved canopy stability.

It is also an object of the present invention to provide a LEI kite design that exhibits greater framework rigidity.

It is another object of the present invention to provide a LEI kite design increases the stability of kite at relatively lower inflation pressures.

It is yet another object of the present invention to provide a LEI kite design that maintains performance while decreasing weight and increasing durability.

It is an also an object of the present invention to provide an aerodynamic wing having a canopy surface with controlled alteration of lifting characteristics in response to forces experienced by the wing. Specifically, the canopy surface comprises inflatable structures that extend the canopy

SUMMARY OF THE INVENTION

In accordance with the above objects and those that will be mentioned and will become apparent below, the present invention is an aerodynamic wing with a leading edge, a trailing edge, a flexible canopy forming a lifting surface, and at least one inflatable, elastically deformable member integrated into the lifting surface, wherein the elastically deformable member extends and contracts the lifting surface depending on forces experienced by the wing. Preferably, the elastically deformable member comprises an elongated tube and a plurality of elastically deformable members can be used.

The flexible canopy may be secured to two points, radially spaced apart on the circumference of the elastically deformable member for at least a portion of the length of the elastically deformable member. In a preferred embodiment, the elastically deformable member and flexible canopy are configured so that increasing the forces experienced by the wing deforms the elastically deformable member and extends the lifting surface. Generally, extension of the lifting surface alters the aerodynamic characteristics of the wing. Also preferably, this extension results in a reduction in lifting force.

In further embodiments of the invention, the elastically deformable member is configured to impart an airfoil profile to the lifting surface upon inflation. In one application, the wing is configured as a kite, adapted to be controlled by at least two control lines that also transmit lifting force. In such embodiments, the kite further comprises an inflatable strut that is configured to impart a profile to the leading edge of the wing, which preferably is substantially arc shaped. Preferably, the elastically deformable member is secured to the leading edge inflatable strut.

In another embodiment, the invention comprises an inflatable kite having an inflatable leading edge strut, at least one inflatable rib strut having a circumference and a length, and a flexible canopy formed from at least one shaped panel, wherein the flexible canopy is secured to the rib strut at two radially spaced points on the circumference of the rib strut for at least a portion of the length of the rib strut. Preferably, the portion of the length of the rib strut secured to the flexible canopy at two points is at least about one-quarter of the length of the rib strut and more preferably, about three-quarters of the length.

In preferred embodiments of the invention, the flexible canopy and a segment of the rib strut between the at least two radially spaced points forms a lifting surface having aerodynamic characteristics and wherein force applied to the kite deforms the rib strut to extend the lifting surface and alter the aerodynamic characteristics. In accordance with the invention, the flexible canopy and rib strut can be configured to reduce generated lifting force upon deformation of the rib strut.

The invention also comprises a method for controlling aerodynamic characteristics of a wing in response to applied forces, comprising the steps of providing an inflatable kite comprising an inflatable leading edge strut, at least one inflatable rib strut having a circumference and a length, a flexible canopy formed from at least one shaped panel, wherein the flexible canopy is secured to the rib strut at two radially spaced points on the circumference of the rib strut for at least a portion of the length of the rib strut, and a lifting surface formed by the flexible canopy and the rib strut, increasing a force to the inflatable kite, deforming the rib strut, and extending the lifting surface.

In such embodiments, the method can further comprise the steps of decreasing a force to the inflatable kite, reforming the rib strut and contracting the lifting surface.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Before describing the present invention in detail, it is to be understood that this invention is not limited to particularly exemplified materials, methods or structures as such may, of course, vary. Thus, although a number of materials and methods similar or equivalent to those described herein can be used in the practice of the present invention, the preferred materials and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

Finally, as used in this specification and the appended claims, the singular forms "a", "an" and "the" include plural referents unless the content clearly dictates otherwise.

The present invention is an aerodynamic wing having a lifting surface with a leading edge, a trailing edge, and a flexible canopy that substantially forms a lifting surface. With reference to presently preferred embodiments, canopy is used to describe the material that forms the majority of a wing used in a lifting application, such as a parachute, hang glider or kite. However, canopy, as used herein, also is meant to include the body of a sail, and the like. The wing also has an inflatable, elastically deformable member integrated into the lifting surface, wherein the elastically deformable member extends and contracts the lifting surface depending on forces experienced by the wing. Preferably, the elastically deformable member comprises an elongated tube and can also function as a strut for imparting an airfoil profile to the lifting surface.

The elastically deformable member is integrated into the lifting surface by being secured to the canopy at two points, radially spaced apart on the circumference of the elastically deformable member for at least a portion of the length of the elastically deformable member. Preferably, the elastically deformable member and flexible canopy are configured so that increasing the forces experienced by the wing deforms the elastically deformable member and extends the lifting surface. Generally, depending upon the design parameters, extension of the lifting surface alters a number of aerodynamic characteristics of the wing, such as its efficiency, angle of attack, lifting coefficient, handling, responsiveness and the like. More preferably, this extension is designed to result in a reduction in lifting force to counteract the upward spike in force applied to the wing.

Figure 1:
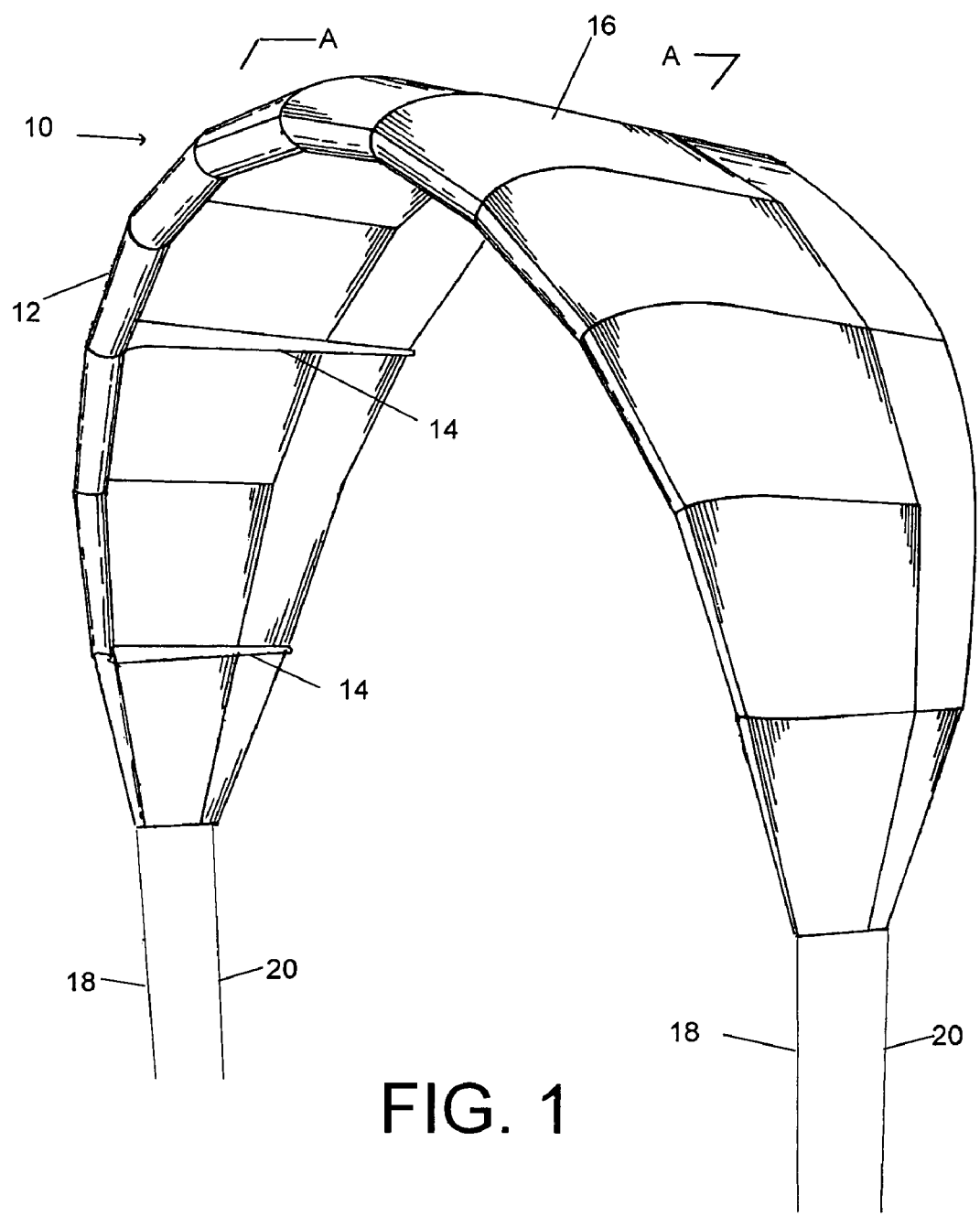
FIG. 1 is a perspective view of a prior art kite.

Turning to FIG. 1, a prior art, inflatable leading edge (LEI) kite 10 is shown to provide a context for the various advantages made possible by the present invention. As can be seen, kite 10 is generally in the shape of an arc and comprises an inflatable strut 12 that forms the leading edge of kite 10. A plurality of rib inflatable struts 14 are aligned transversely with leading edge strut 12. A canopy 16 is secured to the top of the framework created by struts 12 and 14. Control lines 18 and 20 are attached to the tips of kite 10. Kite 10 as shown comprises a conventional four line kite that utilizes front lines 18 to sheet kite 10 by changing the angle of attack and back lines 20 to transmit steering forces.

Figure 2:
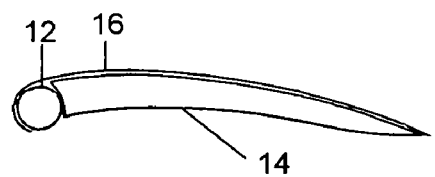
FIG. 2 is a sectional side view with detail showing a prior art strut and canopy connection.

FIG. 2 is a sectional view of kite 10, taken at point A, showing the prior art attachment of canopy 16 to leading edge strut 12 and rib strut 14; As can be seen, rib strut 14 lies beneath the surface of the canopy and thus, the cross sections of each rib strut 14 offer only a single radial point of attachment to canopy 16.

The present invention is an aerodynamic wing having a canopy surface with controlled extension and retraction in response to forces experienced by the wing. Specifically, the canopy surface comprises inflatable structures, elastically deformable members that extend the canopy surface upon deformation. In a preferred embodiment, the inflatable structures can also impart structure to the canopy surface. The principles of this invention can be applied to any aerodynamic wing formed by a flexible material, such as a sailboat sail, a windsurfing sail, a parachute, a paraglider, a hang glider, kites for powering boats or other vehicles and the like.

Figure 3:
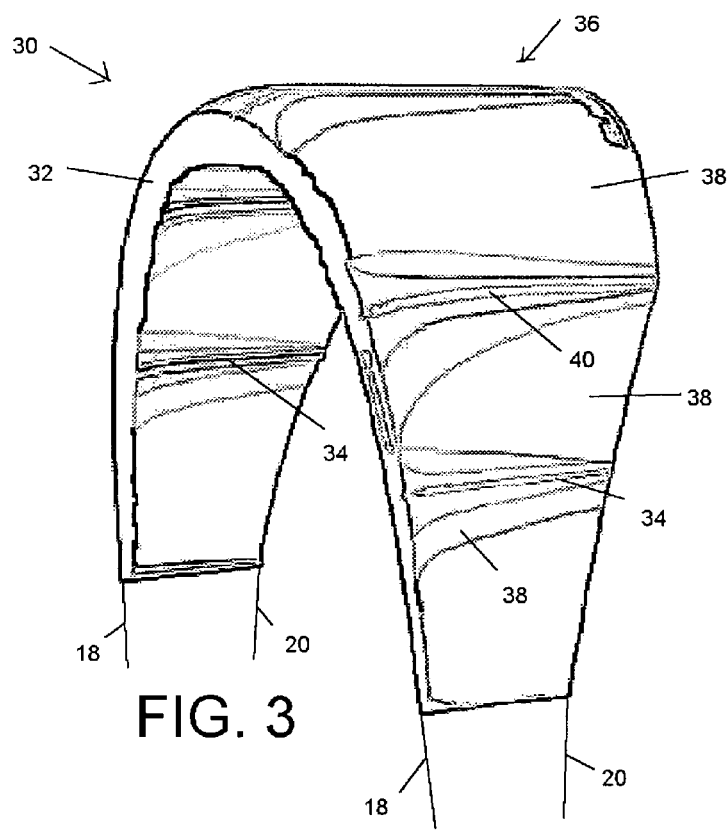
FIG. 3 is a perspective view of a LEI kite embodying features of the invention.

Despite the general applicability of this invention to a wide range of aerodynamic wings, a number of advantages of the invention can be seen in reference to a presently preferred embodiment, a traction kite configured to power a user on a vehicle across a suitable surface, such as a planing member on water. As shown in FIG. 3, kite 30 is a LEI design, which in a currently preferred embodiment is configured for kite surfing use. Kite 30 has a leading edge inflatable strut 32 as well as a plurality of rib struts 34. As known in the art, canopy surface 36 typically comprises multiple panels 38, each of which has a specific shape. When the shaped panels are sewn together, the two-dimensional canopy material can take on a three-dimensional profile. Panel materials can be any suitable planar, flexible materials including cotton, paper, plastics, such as polyesters, Mylar, Teijin, Dacron, polyurethane, vinyl, and/or nylon, other fabrics, and the like. A presently preferred material is a rip stop high tenacity polyester fabric. Canopy surface 36 is secured to inflatable struts 32 and 34 to maintain that three-dimensional profile. Rib struts 34 comprise the elastically deformable members of the invention that control canopy tension. In many embodiments, the struts in a LEI kite comprise a casing made of materials similar to canopy panel materials, but generally higher strength. The casing is responsible for imparting shape and strength to the strut, but is not necessarily sufficiently air-tight. In such cases, a relatively air-tight bladder (not shown) that upon inflation expands within the casing to support and define the structure. Suitable bladder materials include polyethylene, rubbers, latex, and the like.

Figure 7:
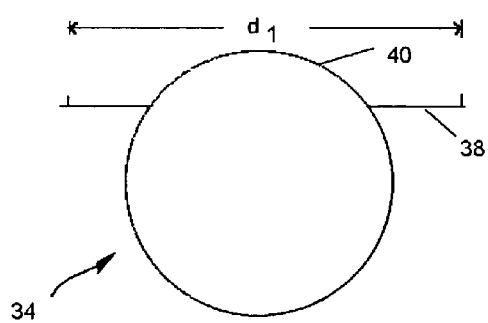
FIG. 7 is a cross section of the inventive strut and canopy connection from FIG. 5.
Figure 4:
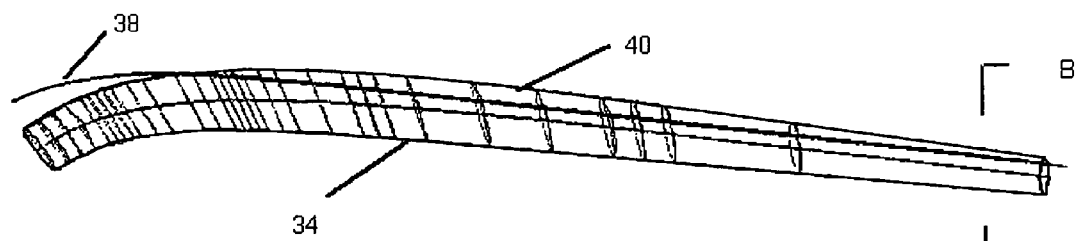
FIG. 4 is sectional side view showing the strut and canopy connection of the invention.
Figure 5:
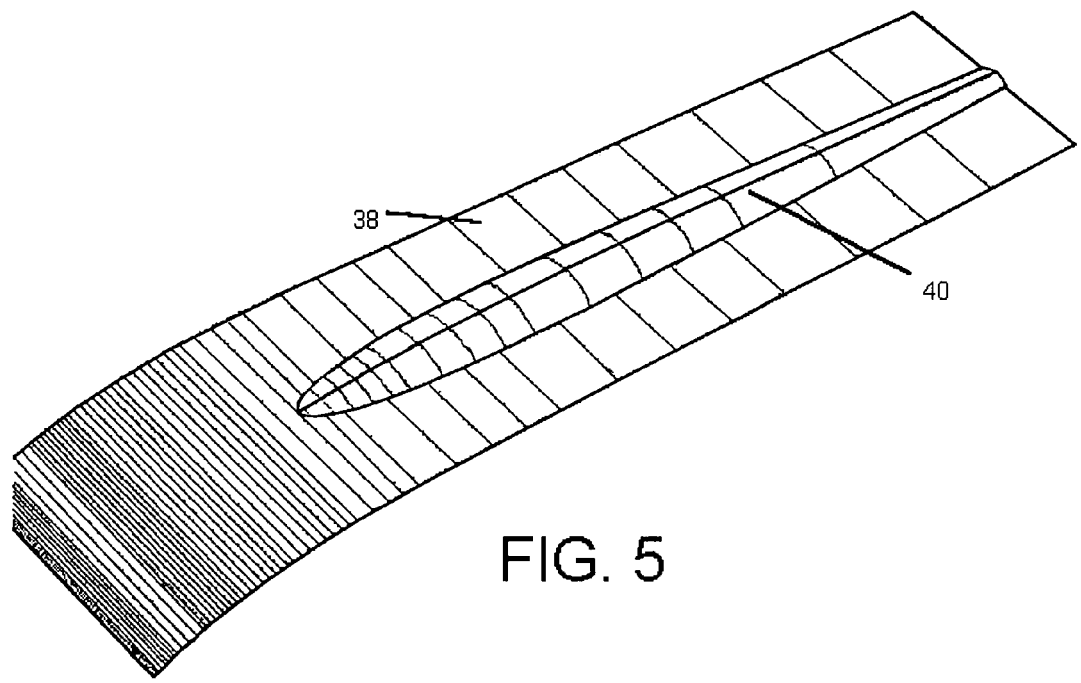
FIG. 5 is a perspective top view showing the strut and canopy connection of the invention.
Figure 6:
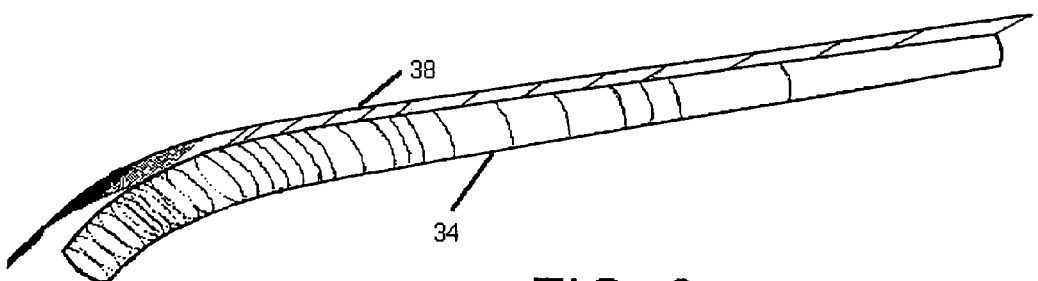
FIG. 6 is a perspective bottom view showing the strut and canopy connection of the invention.

As can be seen in greater detail in FIGS. 4-6, rib struts 34 are integrated into canopy surface 36 so that a portion 40 of the strut, together with the shaped panels 38 to form the surface 36. At the connection to the leading edge strut 32, rib strut 34 is positioned below canopy surface 36, allowing canopy surface 36 to form a smooth covering over the leading edge structure. As rib strut 34 extends towards the trailing edge, upper portion 40 of strut 34 is incorporated into canopy surface 36. FIG. 7 is a cross sectional view of the integrated strut and canopy attachment taken at line B in FIG. 5. As can be seen, this method of attachment has the effect of creating two points of attachment 42 radially spaced along the circumference of strut 34, where the strut is secured to shaped canopy panels 38 wherever strut 34 is incorporated into the canopy. This adds considerable stability to the overall canopy and strut structure. In general, the amount of strut 34 that is incorporated canopy surface 36 depends upon the characteristics desired. In the presently shown embodiment, strut 34 is incorporated near the attachment point to the leading edge strut 32.

Thus, the shape of canopy surface 36 which is created by the shaped panels 38 and the incorporated portion 40 of strut 34, as supported by the framework of struts 32 and 34 as well as by the dynamic loads of the wind on the canopy surface 36 when kite 30 is in flight forms an upper surface of a lift-producing aerodynamic wing, the lifting surface. As such, it has a number of characteristics, such as a leading edge 42, a trailing edge 44, and a chord line that connects the leading edge to the trailing edge. The chord line of the wing with respect to horizontal determines the angle of attack (AoA). Kite 30 also has a camber, determined by the curvature of canopy surface 36. The coefficient of lift for a given wing depends upon its camber. Further, the aspect ratio of kite 30 is determined by dividing the span of the kite by its chord width. While increasing the aspect ratio has the general effect of increasing the efficiency of the wing it can also detrimentally affect the handling of the kite.

Figure 8:
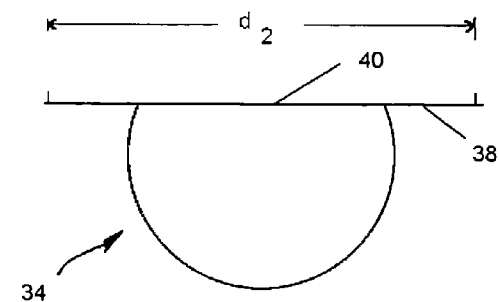
FIG. 8 is an alternative cross section of the inventive strut and canopy connection from FIG. 5.

A primary benefit of the integrated strut and canopy construction of this invention is that the portion of the rib strut that is integrated into the canopy surface can dynamically adjust the canopy shape in response to the load applied to kite 30. Specifically, inflation of struts 34 imparts a tension to canopy surface 36. FIGS. 7 and 8 show a cross section of the integrated strut and canopy of the invention taken at line B in FIG. 5. In FIG. 7, the strut and canopy configuration is shown with relatively small applied loads. If the applied load is below a threshold determined by the construction of the kite and the materials used, the strut will exhibit a round profile and the width of a given canopy portion will be $d_1$ as shown. As the applied load on the kite exceeds the threshold, the portion of strut 34 that contributes to canopy 36 will progressively flatten, until it reaches the maximum extended configuration shown in FIG. 8. As can be seen, force on canopy surface 36 has overcome the tension imparted by the inflation force of rib strut 34. This has the effect of increasing the width of the given canopy portion to $d_2$.

As one of skill in the art will recognize, the difference between $d_1$ and $d_2$ represents the amount of possible extension present in each canopy portion having a strut 34. The kite designer can easily control the amount of available extension by changing the attachment point of strut 34 to canopy panels 38. Maximum extension is permitted by positioning the strut attachment points at opposite sides of the strut. Moving the attachment points closer along the circumference of the strut profile leads to a corresponding decrease in the amount of strut material that is incorporated into the canopy surface. Clearly, this decreases the amount of extension that will be permitted when strut 34 is deformed by load. Kite designers may also alter the diameter of the strut while maintaining the relative location of the attachment points constant to vary the amount of extension available. Further, a relatively greater number of struts 34 can be incorporated into the kite 30 to increase the amount of potential extension while holding the other characteristics constant. Moreover, the amount of pressure used to inflate struts 34 offers yet another means to control the characteristics of the wing. For example, as discussed above, desirable handling characteristics can be achieved in LEI kites using less pressure. Specifically, inflation pressure of 6 to 8 psi are sufficient to produce a very stable structure while dynamically reacting to applied forces due to the deformation of struts 34. In contrast, other conventional LEI kites may require upwards of 12 psi to achieve desired characteristics. Despite the above benefits of using relatively lower pressure, in other embodiments significantly higher pressures may be desirable and the designs of this invention are readily adaptable.

In operation, the dynamic extension of the canopy surface due to the elastic deformation of struts 34 described above produces desirable handling characteristics. For example, when very little force is applied to canopy surface 36, as in the case of a lull in the wind, struts 34 take on their full, rounded profile, thus tensioning the canopy surface. This has the effect of increasing the lift developed by the kite 30 by increasing the angle of attack. This also has the tendency of moving the kite further back into the wind window, which also increase the power developed by the kite. In contrast, when the canopy surface 36 is experiencing increased forces, such as in a gust, struts 34 will deform, extending the canopy surface 36. As one of skill in the art will recognize, this has the effect of decreasing the angle of attack and depowering the kite. The kite will also tend to move forward in the wind window, which may decrease the power in the kite as well as applying the force of the kite in direction more aligned with the traveling direction of the user. When the increased force on the canopy surface is relaxed, struts 34 revert to their more rounded configuration, contracting the canopy surface. Thus, the dynamic extension and contraction of the canopy surface 36 tends to counteract variability in wind strength, significantly improving the performance of kite 30.

Another benefit associated with the dynamic change in canopy surface 36 shape is improved tactile response for the operator. The extension and contraction of canopy surface 36 due to the deformation of struts 34 transmits subtle forces through control lines 18 and 20. This results in an improved "feel" for the kite that allows the user to sense the location and movement of the kite through feedback at the control lines.

The handling and performance of a kite are greatly effected by the overall rigidity of the wing. Accordingly, there are numerous other benefits associated with the integrated strut and canopy connection. As discussed above, the integration increases the strength and stability of the kite. Increasing the stability of the strut framework and canopy structure also improves the responsiveness and handling of the kite, while providing enhanced tactile feedback to the user. Indeed, the structural support and strength added by the integrated strut and canopy design allows the use of less material while still improving the overall durability of the kite. In turn, this reduces weight and provides the concurrent benefits of a lighter and more responsive kite.

Another related benefit is that a reduced diameter strut may be used, at a relatively lower pressure while still increasing the rigidity of the structure as compared to the prior art. In one embodiment, strut diameter can be reduced by 30% with respect to conventional, prior art strut design while maintaining and improving the structural strength and stability of the kite. The reduced diameter struts provide interrelated enhancements to the characteristics of the kite. Since smaller diameter struts are required, there are significant savings and weight and costs of materials. The reduced diameter struts also reduce the drag developed by the kite, which generally improves the overall performance and efficiency of the kite. Yet another benefit is the ability to use lower pressures to provide improved support. This increases the reliability and durability of the kite by reducing the risk of rupture or puncture failures of the struts.

Yet another benefit offered by the integrated strut and canopy design of the invention is increased durability. Certain prior kite designs have incorporated additional strips of high strength material sewn into the canopy to limit the migration of tears in the relatively weak canopy material. The attachment of shaped panels 38 to upper portion 40 of strut 34 inherently creates a rip stop zone, which obviates the necessity of adding separate material. Thus, rips in the canopy material will stop at the intersection of the canopy panel 38 and strut portion 40, rather than extending into the struts, leading edge or a greater portion of the canopy. This allows the damage to be repaired by simply replacing the relatively inexpensive canopy panel. Accordingly, one is able to create a kite that is as durable, but is lighter in weight. This both improves handing and cost of manufacture.

The integrated rib strut design is distinguished from the prior art strut and canopy connection described above with respect to FIGS. 1 and 2. In the prior art, strut 14 is simply suspended beneath the surface of canopy 16 and connected at a single point, forming a line of connection 18 where the strut touches the canopy. Since only a single line of connection is formed, relatively little stability is achieved in directions not aligned with the axis of connection. In contrast, the integrated strut and canopy connection of the invention creates two points of connection where the upper portion of the rib strut becomes the canopy surface, thus creating two lines of connection, as shown most clearly in FIG. 5.

Figure 9:
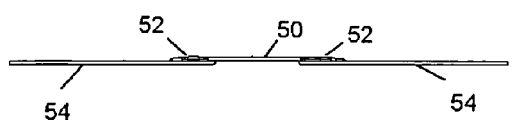
FIGS. 9–12 show construction details of a strut and canopy connection of the invention.
Figure 10:
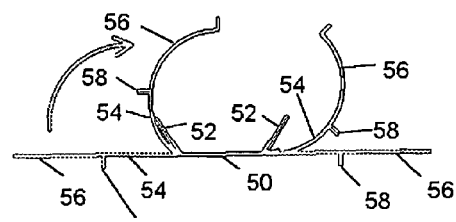
Figure 11:
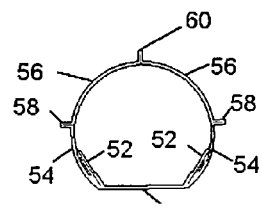
Figure 12:
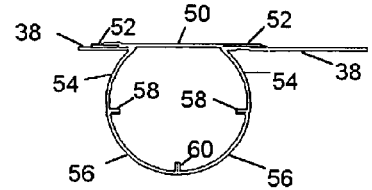

As one of skill in the art will recognize, other conventional control line systems are applicable to these types of kites. For example, an inflatable kite having features of the invention can be controlled by two lines with the addition of a bridle. Other kite line control systems can be used as well:

A number of methods can be used to construct suitable inflatable, elastically deformable members for use in controlling canopy tension. One embodiment useful in the construction of LEI kites is shown at various stages of construction in the sectional views shown in FIGS. 9-12. FIG. 9 first shows what will be the top portion 50 of rib strut 34 that is incorporated into canopy surface 36. The edges of top portion 50 are folded over and secured by a flat seam 52 to two upper body portions 54 of rib strut 34. This assembly is turned over and two lower body portions 56 are secured by flat seams 58 to upper body portions 54 as shown in FIG. 10. The two edges of lower body portions 56 are then secured by flat seam 60 to form the inverted rib strut 34 as shown in FIG. 11. Finally, the assembly is turned inside out as shown in FIG. 12. As one of skill in the art will appreciate, the formation of flat seams 52 to secure top portion 50 are important as this aligns the seams with the shaped panels 38. This facilitates the formation of a smooth canopy surface 36, which provides aerodynamic efficiency and reduces friction wear at the panel and strut connection. If desired, an addition fabric material can be incorporated in flat seam 52 between the layers of top portion 50 and upper body portions 52 to create a greater surface for subsequent connection to panels 38.

As one of skill in the art will recognize, it is possible to adapt the construction of struts 32 and/or 34 so that an air-tight material is used to form the strut, removing the necessity of using a separate bladder. The formation of flat seams 52 facilitates this operation because it offers a surface that may be sewn to the canopy panels without compromising the air tight integrity of the strut.

Figure 13:
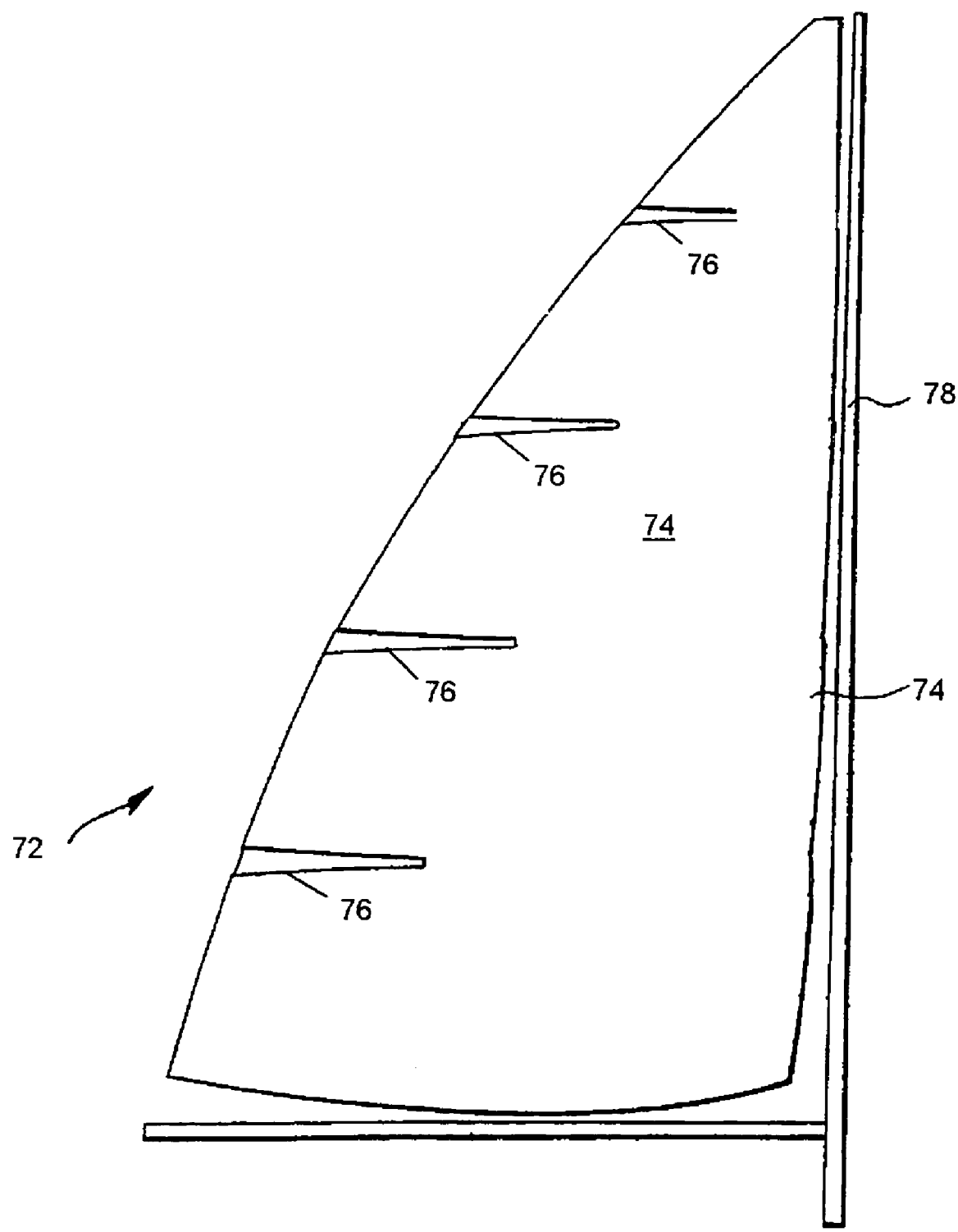
FIG. 13 shows features of the invention incorporated into a sailboat sail.

The concepts of this invention can used in any number of applications. One example is for a sail boat. As shown in FIG. 13, a sail 72 for powering a boat is shown. The aerodynamic wing is sail 72 that generally comprises a sail body 74, or "canopy" as that term is used in this application, that incorporates inflatable, elastically deformable members configured as battens 76 to control tension in sail 72. One will recognize that the desired tension control depends significantly upon the application. In sail boats, for example, it may be desirable to affect tension primarily in the leech of the sail Accordingly, battens 76 may be positioned only adjacent the trailing edge of sail 72. In other applications, however, battens 76 can extend nearly to the mast 78.

The invention also lends itself to other generalized applications involving any flexible material supported by a framework of inflatable members. As can be appreciated, the novel concepts of the invention allow the material to be attached to the framework in such a way as to allow significant control over tension on the material. Specifically, as discussed above with respect to preferred embodiments, deformation of the inflatable members resulting from applied forces can be used to adjust tension in the material.

Described herein is a preferred embodiment, however, one skilled in the art that pertains to the present invention will understand that there are equivalent alternative embodiments.

What is claimed is:

1. An aerodynamic wing comprising a leading edge, a trailing edge, a flexible canopy forming a lifting surface, and an elastically deformable member having a length integrated into the lifting surface, wherein the elastically deformable member extends and contracts the lifting surface in a direction substantially perpendicular to the length of the elastically deformable member depending on lifting forces experienced by the wing, wherein the elastically deformable member and canopy are configured to impart a camber to the lifting surface, and wherein the elastically deformable member longitudinal axis is oriented substantially perpendicular to a lifting force developed by the lifting surface when subjected to an airflow having a direction and longitudinal axis is oriented substantially parallel with the airflow direction.

2. The wing of claim 1, wherein the elastically deformable member comprises an elongated tube having a circumference and wherein the elastically deformable member is oriented to run in a direction from the leading edge to the trailing edge.

3. The wing of claim 2, wherein the flexible canopy is secured to two points, radially spaced apart on the circumference of the elastically deformable member for at least a portion of the length of the elastically deformable member.

4. The wing of claim 3, wherein the elastically deformable member and flexible canopy are configured so that increasing the forces experienced by the wing deforms the elastically deformable member and extends the lifting surface.

5. The wing of claim 4, wherein extension of the lifting surface alters the aerodynamic characteristics of the wing.

6. The wing of claim 5, wherein the alteration of the aerodynamic characteristics comprises a reduction in lifting force.

7. The wing of claim 3, wherein the elastically deformable member is configured to impart an airfoil profile to the lifting surface upon inflation.

8. The wing of claim 7, wherein the wing is configured as a kite, having at least two control lines for transmitting lifting force.

9. The wing of claim 8, further comprising an inflatable strut that is configured to impart a profile to the leading edge of the wing.

10. The wing of claim 9, wherein the inflatable strut is configured to impart a substantially arc shaped profile to the leading edge of the wing.

11. The wing of claim 10, wherein elastically deformable member is secured to the inflatable strut.

12. The wing of claim 1, wherein the wing comprises a substantially arc shaped kite and wherein the leading edge is inflatable.

13. A method for controlling aerodynamic characteristics of a wing in response to applied forces, comprising the steps of:
   a) providing aerodynamic wing comprising a leading edge, a trailing edge, a flexible canopy forming a lifting surface, and an elastically deformable member having a length with a longitudinal orientation integrated into the lifting surface, wherein the canopy and elastically deformable member are configured to impart a camber to the lifting surface;
   b) subjecting said aerodynamic wing to an airflow having a direction substantially parallel to the longitudinal axis of the elastically deformable member to generate the lifting force substantially perpendicular to the elastically deformable member;
   c) increasing a force to the aerodynamic wing in response to the increased lifting force;
   d) deforming the elastically deformable member; and
   e) extending the lifting surface in response to the deforming of the elastically deformable member a direction substantially perpendicular to the length of the elastically deformable member.

14. The method of claim 13, further comprising the steps of decreasing a force to the aerodynamic wing, reforming the elastically deformable member and contracting the lifting surface.

* * * * *